(12) United States Patent
Susnjara

(10) Patent No.: US 9,527,178 B2
(45) Date of Patent: Dec. 27, 2016

(54) APPARATUS FOR INVERTING LARGE PANELS

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 259 days.

(21) Appl. No.: 14/254,081

(22) Filed: Apr. 16, 2014

(65) Prior Publication Data
US 2015/0298916 A1 Oct. 22, 2015

(51) Int. Cl.
*B65G 7/08* (2006.01)
*B23Q 7/00* (2006.01)
*B27M 1/08* (2006.01)

(52) U.S. Cl.
CPC .................. *B23Q 7/00* (2013.01); *B27M 1/08* (2013.01); *B23Q 2240/002* (2013.01)

(58) Field of Classification Search
CPC ..... B65G 47/252; B65G 47/244; B65G 47/24; B23Q 2240/002; B23Q 7/00; B27M 1/08
USPC ............... 414/758, 762, 763, 764, 769, 782, 783,414/779; 198/373, 375, 402, 403; 74/840, 841, 74/842
See application file for complete search history.

(56) References Cited

U.S. PATENT DOCUMENTS

| | | | | |
|---|---|---|---|---|
| 2,626,071 A * | 1/1953 | Smith | .................... | B65G 65/23 414/421 |
| 3,318,629 A * | 5/1967 | Brandt, Jr. | ............. | A01D 46/26 248/231.41 |
| 3,610,397 A * | 10/1971 | Bok | ..................... | B65G 47/252 118/314 |
| 4,921,387 A * | 5/1990 | Bennington | ......... | B21D 43/145 198/468.6 |
| 5,046,916 A * | 9/1991 | Sorensen | ............. | B21D 43/105 198/375 |
| 5,344,275 A * | 9/1994 | Habicht | ................... | B66F 9/02 414/420 |
| 5,403,146 A * | 4/1995 | Jones | ....................... | B23Q 7/04 414/729 |
| 6,419,983 B1 * | 7/2002 | Kreuzer | ................... | B05C 3/10 118/322 |
| 6,702,543 B1 * | 3/2004 | Nora et al. | ............. | B65G 65/23 414/419 |
| 7,275,480 B2 * | 10/2007 | Greve | ..................... | A23L 3/001 100/269.04 |
| 7,341,421 B2 * | 3/2008 | Kyrstein | .............. | B65G 47/252 198/402 |
| 8,061,951 B2 * | 11/2011 | Marston | .................. | B66C 1/101 294/68.26 |
| 8,315,731 B2 * | 11/2012 | Susnjara | ............ | G05B 19/4097 700/159 |

(Continued)

*Primary Examiner* — Michael McCullough
*Assistant Examiner* — Lynn Schwenning
(74) *Attorney, Agent, or Firm* — Bookoff McAndrews, PLLC

(57) ABSTRACT

An apparatus for inverting a panel including a base assembly, an elongated support assembly mounted on the base assembly, a carriage assembly mounted on the support assembly displaceable along the length thereof, means for displacing the carriage assembly along the length of the support assembly, an elongated beam assembly provided with means for detachably securing a panel, pivotally connected to the carriage assembly and means for pivoting the beam assembly relative to the support assembly.

20 Claims, 5 Drawing Sheets

(56) References Cited

U.S. PATENT DOCUMENTS

2009/0162178 A1* 6/2009 Brommer ............... B42C 19/08
                                                414/741
2011/0091309 A1* 4/2011 May .................... B65G 7/08
                                                414/758
2012/0328406 A1* 12/2012 Shock .................. B21D 37/14
                                                414/758

* cited by examiner

APPARATUS FOR INVERTING LARGE PANELS

This invention relates to an apparatus for inverting large panels and more particularly to such an apparatus for inverting such panels for the purpose of performing machining functions on opposite sides thereof.

BACKGROUND OF THE INVENTION

CNC routers often are used to machine parts from sheets of material such as plywood or particleboard. Such parts generally are arranged or nested on a sheet in an attempt to obtain the most efficient possible use of the material and to generate the least amount of scrap. Such process is known in the trade as "nested based manufacturing" when used in the manufacture of such articles as cabinets and furniture. For many of such products utilizing such process, certain parts must be machined on both sides. The traditional method of accomplishing this is to machine the first surface, cut the individual parts free, reload the cut parts onto the machine and process the backside of each part independently. In the prior art, there is provided a method for first performing such required cutting operations on the back side of a material sheet, next causing the CNC program to pause and prompt the operator to invert the sheet, and upon the completion of the manual inverting operation, completing the machining operation on the reverse side of the sheet. Although such prior art method has been an improvement over the previous method of machining both sides of a panel, such method presents a major drawback. Certain sheets of material, in sizes commonly used throughout the industry are both large and heavy inverting such sheets presents a major impediment in the machining operation. While the task of physically turning such sheets over by hand may be adequate for physically capable operators working with smaller, lighter materials, such approach presents a considerable undertaking, even the risk of physical injury to less physically capable operators. Even more capable operators may be challenged when handling larger, heavier materials.

In view of the foregoing, it is the principal object of the present invention to provide an apparatus which may be used by a machine operator to invert large panels mounted on the worktable of a machine for machining opposite surfaces of the panels.

Another object of the present invention is to provide such a machine which would allow such a machine operator to perform such a panel inverting operation without risk of physical injury.

A further object of the present invention is to provide an apparatus operable to invert large panels mounted on the worktable of a machine in the least amount of time.

SUMMARY OF THE INVENTION

The objectives of the invention are achieved by an apparatus operable to invert a panel partially clamped along an edge thereof generally comprising a base assembly, an elongated support assembly mounted on the base assembly, a carriage assembly mounted on the support assembly, displaceable along the length thereof, means operatively interconnecting the carriage assembly and the support assembly for displacing the carriage assembly along the length of the support assembly, an elongated beam assembly including means for detachably securing a panel thereon, pivotally connected to the carriage assembly and means for pivoting the beam assembly relative to the support assembly.

In the preferred embodiment of the invention, the carriage assembly is caused to be displaced linearly along the length of the support assembly, and the linear motion of the carriage assembly is converted into rotational motion of the beam assembly whereby upon displacement of the carriage assembly the full extent of the support assembly, the beam assembly is caused to rotate 180°, correspondingly inverting the panel clamped thereto. Such conversion of motion is provided by a first shaft journaled vertically in the carriage assembly, a second shaft journaled transversely in the carriage assembly and rigidly connected to an end of the beam assembly, a spur gear mounted on the first shaft meshing with a rack disposed along the length of the support assembly functional to rotate the first shaft as the carriage assembly is displaced along the length of the support assembly and a gear set operatively interconnecting the first and second shafts for converting rotational motion of the first shaft to the second shaft.

DETAILED DESCRIPTION OF THE PREFERRED EMBODIMENT OF THE INVENTION

Figure 1:
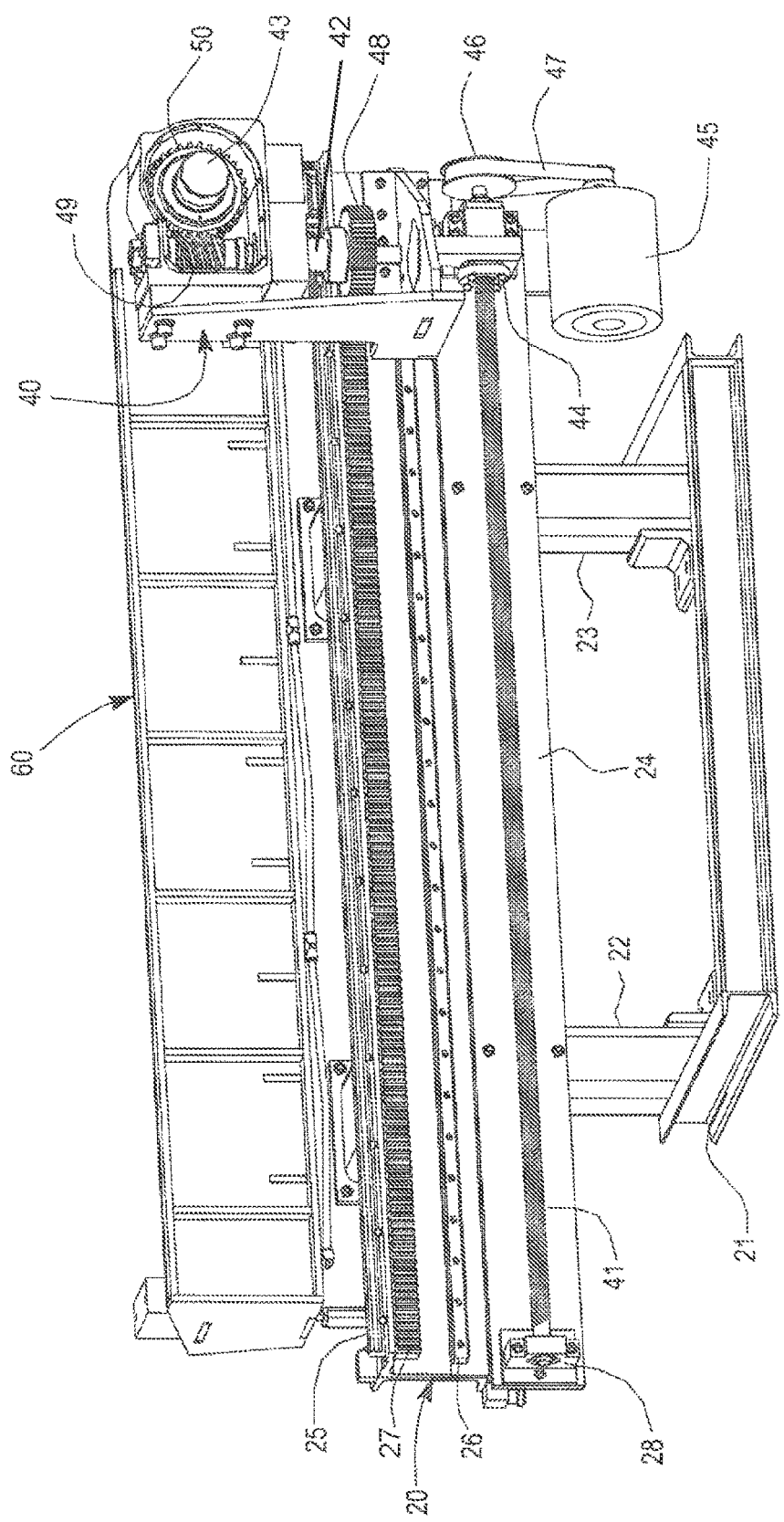
FIG. 1 is a perspective view of an embodiment of the invention.

Referring to FIG. 1 of the drawings, there is illustrated an apparatus embodying the present invention which generally includes a support assembly 20, a carriage assembly 40 mounted on and displaceable linearly along the length of the support assembly and a beam assembly 60 pivotally connected at one end thereof to the carriage assembly, rotatable in the vertical plane of the support assembly. The support assembly includes a base member 21, a pair of support legs 22 and 23 secured to the base member and an elongated support member 24. Carriage assembly 40 is mounted on and displaceable along a set of vertically spaced rails 25 and 26 provided on a side of support member 24. Disposed between rails 25 and 26 on the sidewall of member 24 is a rack 27 extending the full length of support member 24.

Carriage assembly 40 includes a partially supported lead screw 41, a shaft 42 provided with a vertical axis and a shaft 43 provided with an axis disposed orthogonally relative to a plane including the axis of shaft 42. Lead screw 41 extends the length of support assembly 20, is journaled at a far end in a roller bearing provided on a bracket 28 mounted on an end of support member 20, and threaded through a threaded member disposed in a depending component 44 of the carriage assembly. Depending from the carriage assembly is a motor 45 provided with an output shaft drivingly connected to a free end of lead screw 41 by means of a pulley 46 and a drive belt 47. It will be appreciated that by operation of motor 25, lead screw 41 will be caused to be rotationally driven thereby displacing carriage assembly 40 linearly along rails 25 and 26.

Shaft 42 is journaled in the support structure of the carriage assembly and further is provided with a spur gear 48 horizontally aligned and meshing with rack 27, and a helical gear 49. Shaft 43 also is journaled in the support structure of the carriage assembly having an end thereof rigidly secured to an end of beam assembly 60 and is provided with a gear portion 50 meshing with helical gear 49.

Figure 2:
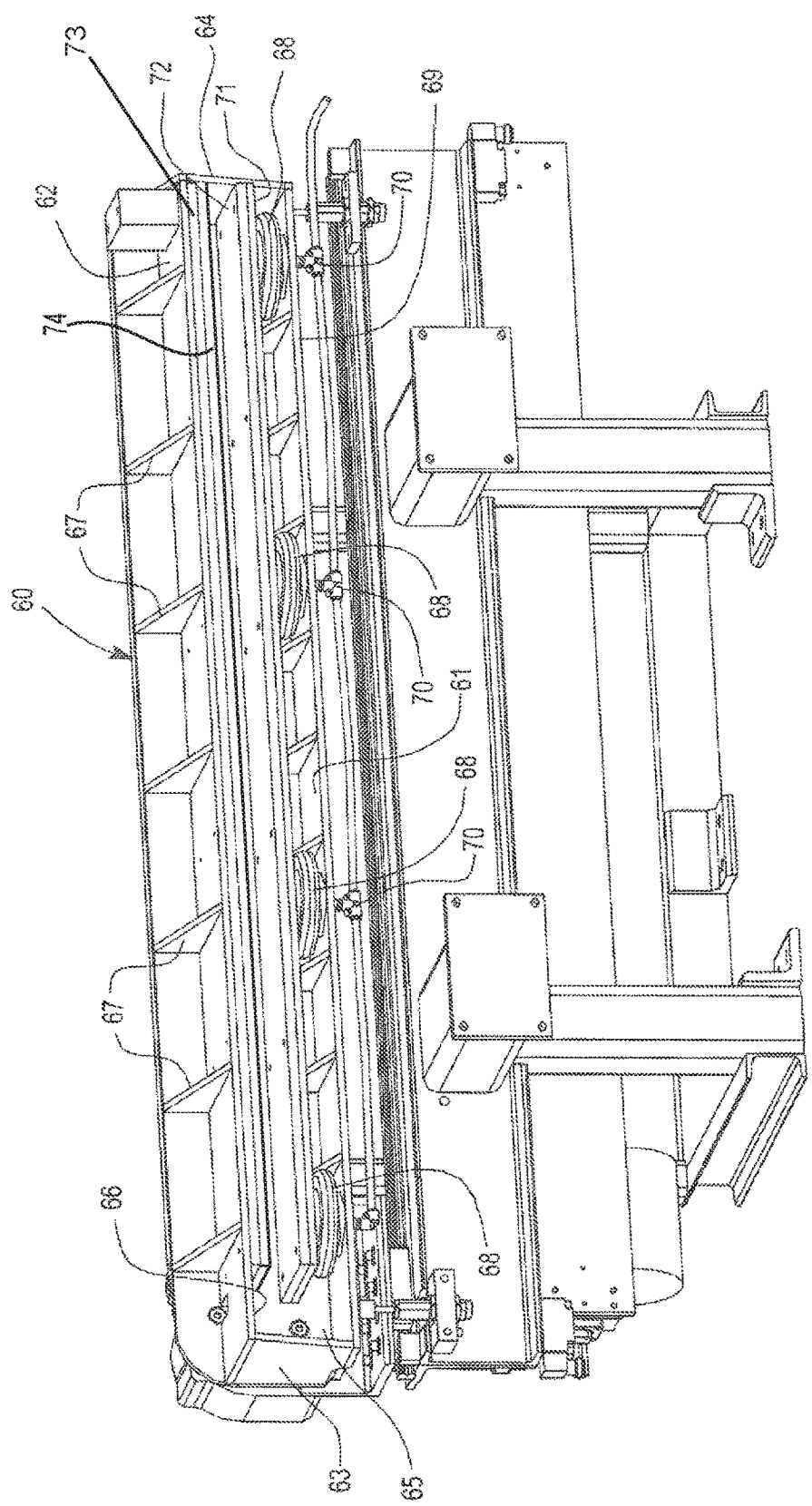
FIG. 2 is a perspective view of the opposite side of the embodiment shown in FIG. 1.
Figure 3:
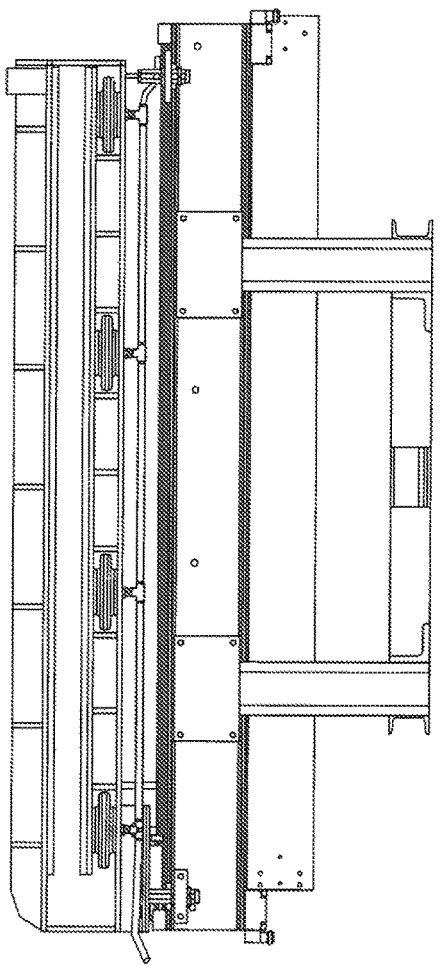
FIG. 3 is an elevational view of the side of the embodiment shown in FIG. 2, illustrating certain clamping means of the embodiment in an unclamped condition.
Figure 4:
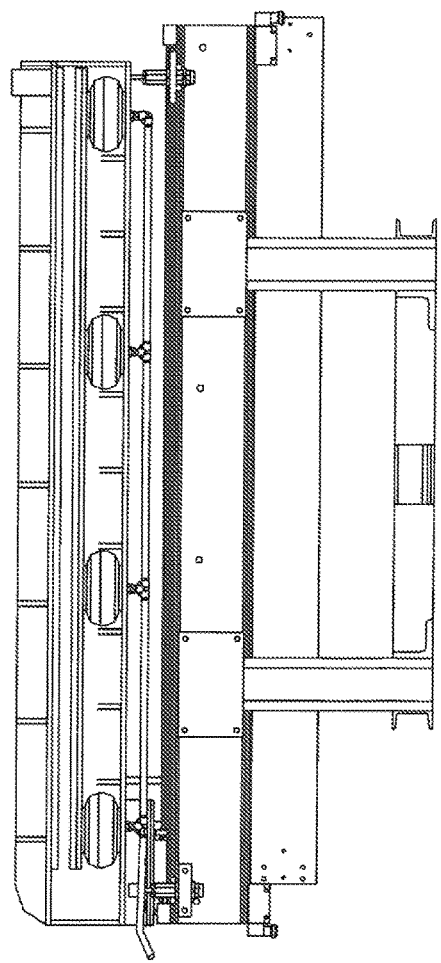
FIG. 4 is a view similar to the view shown in FIG. 3, illustrating the clamping means thereof in a clamped condition.

As best shown in FIG. 2, frame assembly 60 includes a pair of spaced, elongated components 61 and 62 having lengths substantially equal to the length of support assembly 20, a pair of end wall components 63 and 64 and a sidewall component 65 providing an elongated recess 66 providing a lateral opening. Sidewall component 65 extends beyond component 62 and further is provided with a set of reinforcing brackets 67. Secured to and spaced along beam component 61 within recess 66 is a set of inflatable bladders 68, each connected to a fluid supply line 69 provided with a set of inlet fixtures 70. Mounted on the inflatable bladders is an elongated plate 71 on which there is mounted a rubber gripping pad 72. Disposed on the underside of frame component 62 is a similar panel 73 provided with a comparable rubber gripping pad 74.

Panels to be inverted by the apparatus as described, may be gripped and held by frame assembly 60 merely by inserting an edge of a sheet of material between elongated panels 71 and 73 while the bladders 68 are deflated and then applying fluid under pressure in line 69 to inflate bladders 68 causing the inserted edge of the panel to be gripped between elongated panels 71 and 73.

Figure 5:
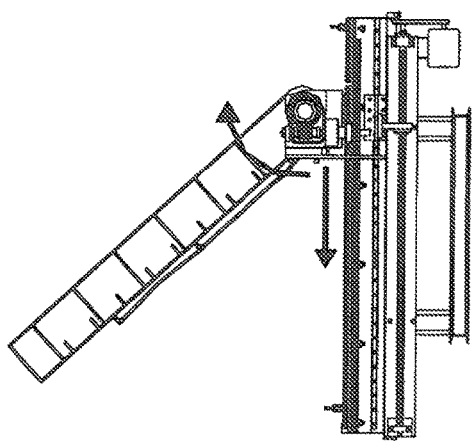
FIG. 5 is a front view of the embodiment shown in FIGS. 1 through 4, illustrating the carriage assembly of the embodiment disposed at one end of the support assembly thereof with the beam assembly thereof resting horizontally on the support assembly.
Figure 6:
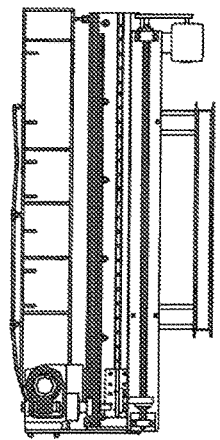
FIG. 6 is a view of the embodiment shown in FIG. 5, illustrating the carriage assembly having been displaced linearly an initial distance from an end of the support assembly and the beam assembly having been displaced rotationally an initial distance from a horizontal position.
Figure 8:
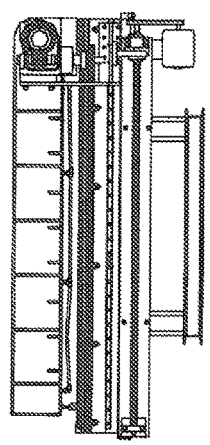
FIG. 8 is a still further view of the embodiment shown in FIG. 5, illustrating the carriage assembly having been displaced the full length of the support assembly and the beam assembly having been inverted 180°.
Figure 7:
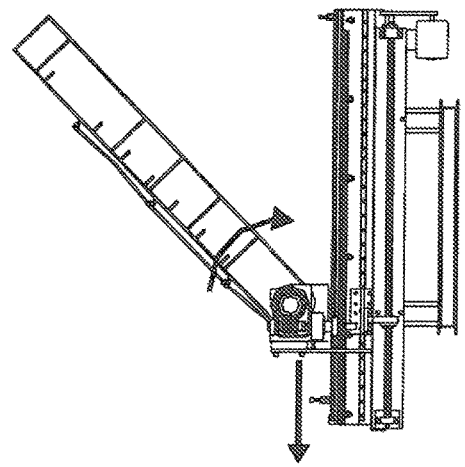
FIG. 7 is a further view of the embodiment shown in FIG. 5, illustrating the carriage assembly having further been displaced linearly and the beam assembly further having been displaced rotationally.

Referring to FIGS. 5 through 8, with the edge of a panel inserted and gripped within the recess of beam assembly 60, in the position as shown in FIG. 5, motor 45 may be energized to rotate lead screw 41 thereby causing spur gear 48 to rotate as it is displaced along rack 27. Simultaneously, as the carriage assembly is displaced along the support assembly, the rotary motion of helical gear 49 is imparted to beam assembly support shaft 43 causing it to rotate in a clockwise direction as shown in FIGS. 6 and 7 as the carriage assembly is displaced, to a fully inverted position as shown in FIG. 8.

Figure 9:
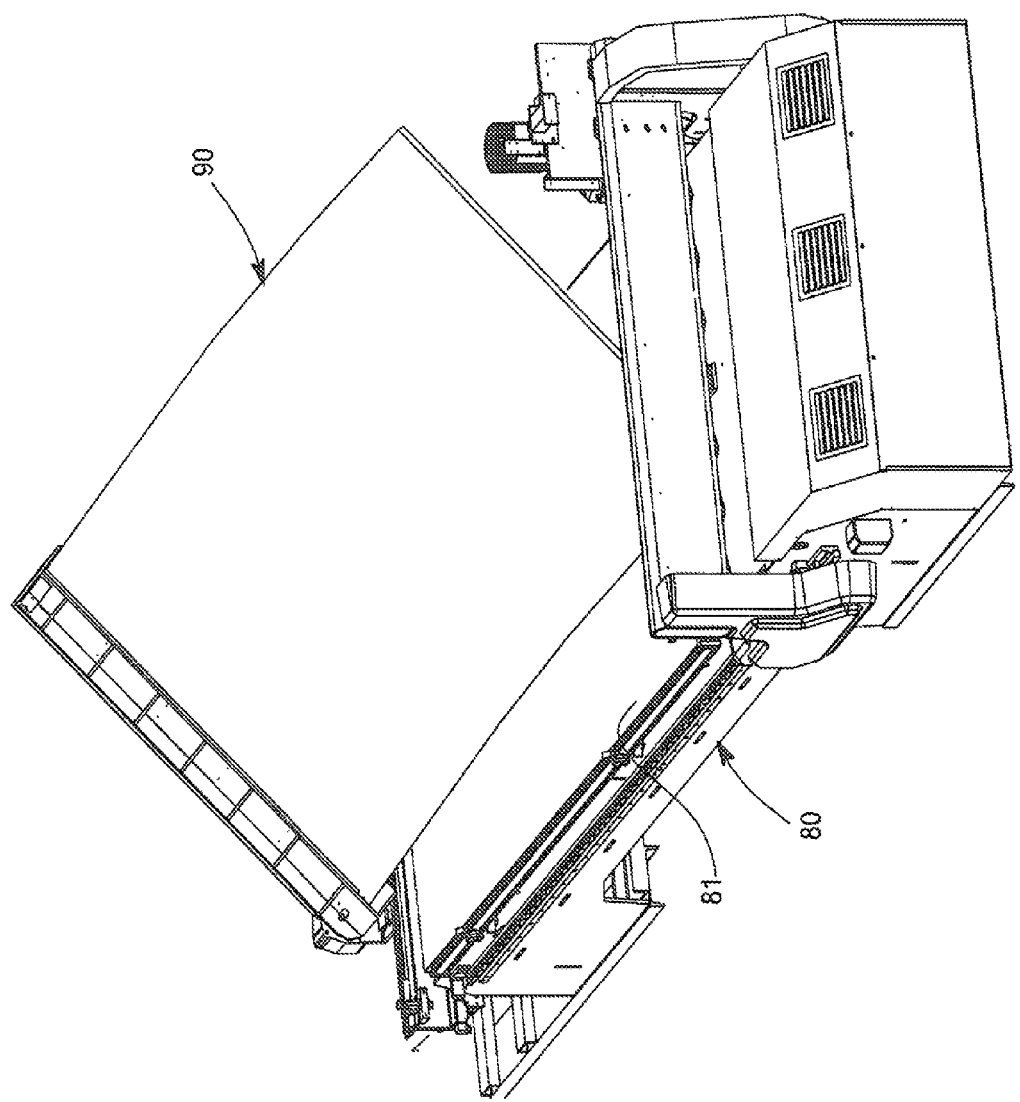
FIG. 9 is a perspective view of the embodiment shown in FIGS. 1 through 8 illustrating a large sheet of material having been loaded on the worktable of a CNC router and gripped by the embodiment in the process of being inverted.

As shown in FIG. 9, the apparatus as described may be positioned at the end of the worktable of a CNC router 80 to invert a panel 90 resting on a worktable 81 merely by sliding the panel resting on the worktable of the router into aligned recess 66 of the adjacent apparatus between panels 71 and 73, inflating the bladders to grip the inserted edge of the panel and then operating motor 45 to cause the panel to be inverted in the manner described.

The apparatus as described allows machine operators without physical capability to easily, quickly and effectively invert a panel in a timely and efficient manner.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. An apparatus for inverting a panel, comprising:
   a support assembly including a lead screw disposed along a length of the support assembly;
   a carriage assembly slidably mounted on the support assembly and displaceable linearly along the lead screw;
   a beam assembly pivotably coupled to the carriage assembly;
   a first actuator configured to simultaneously (i) move the carriage assembly along the lead screw of the support assembly and (ii) rotate the beam assembly around a longitudinal axis of a shaft journaled in the carriage assembly, wherein the shaft is secured to an end of the beam assembly, and wherein the shaft is positioned orthogonally to the lead screw;
   a first gripping member and a second gripping member operably coupled to the beam assembly; and
   a second actuator coupled to the first gripping member and configured to move the first gripping member towards the second gripping member,
   wherein the support assembly and the beam assembly are of substantially equal lengths.

2. The apparatus of claim 1, wherein the first actuator is a motor.

3. The apparatus of claim 1, wherein the second actuator is one of a plurality of second actuators.

4. The apparatus of claim 1, wherein the second actuator is configured to transition between a first compressed configuration and a second expanded configuration.

5. The apparatus of claim 1, wherein the second actuator is an inflatable bladder.

6. The apparatus of claim 1, wherein the beam assembly includes a recess.

7. The apparatus of claim 6, wherein the first gripping member, the second gripping member, and the second actuator are received in the recess.

8. The apparatus of claim 1, wherein a surface of at least one of the first and second gripping members includes a gripping pad.

9. The apparatus of claim 1, wherein the support assembly further comprises a rack disposed along a length of the support assembly, and wherein the lead screw is disposed parallel to the rack.

10. The apparatus of claim 9, wherein the carriage assembly includes a first gear configured to engage with the rack of the support assembly as the carriage assembly moves along the length of the rack.

11. The apparatus of claim 10, wherein the first gear is coupled to a shaft having a second gear operably engaged with the beam assembly.

12. The apparatus of claim 9, wherein the support assembly includes a first rail and a second rail, wherein each of the first and second rails is disposed parallel to the rack, and wherein the rack is disposed in between the first and second rails.

13. The apparatus of claim 1, wherein the lead screw includes a first end portion, an intermediate portion, and a second end portion, wherein the first end portion is journaled in a bracket disposed on the support assembly, the intermediate portion is threadingly coupled to the carriage assembly, and the second end portion is drivingly connected to the first actuator.

14. The apparatus of claim 1, wherein the support assembly includes a plurality of rails extending parallel to the lead screw, and wherein the carriage assembly is configured to slide along the rails of the support assembly.

15. The apparatus of claim 1, wherein the second gripping member is fixedly secured to the beam assembly.

16. An apparatus for inverting a panel, comprising:
a support assembly including a lead screw disposed along a length of the support assembly;
a carriage assembly slidably mounted on the support assembly and displaceable linearly along the lead screw;
a beam assembly pivotably coupled to the carriage assembly;
a first actuator configured to simultaneously (i) move the carriage assembly along the lead screw of the support assembly and (ii) rotate the beam assembly around a longitudinal axis of a shaft journaled in the carriage assembly, wherein the shaft is secured to an end of the beam assembly, and wherein the shaft is positioned orthogonally to the lead screw;
a first gripping member and a second gripping member operably coupled to the beam assembly; and
a second actuator coupled to the first gripping member and configured to move the first gripping member towards the second gripping member,
wherein the support assembly further comprises a rack disposed along a length of the support assembly, and wherein the lead screw is disposed parallel to the rack, and
wherein the carriage assembly includes a first gear configured to engage with the rack of the support assembly as the carriage assembly moves along the length of the rack.

17. The apparatus of claim 16, wherein the first actuator is a motor, and wherein the first gear is coupled to a shaft having a second gear operably engaged with the beam assembly.

18. The apparatus of claim 16, wherein the second actuator is one of a plurality of second actuators.

19. The apparatus of claim 16, wherein the second actuator is configured to transition between a first compressed configuration and a second expanded configuration.

20. The apparatus of claim 16, wherein the second actuator includes an inflatable bladder.

* * * * *